United States Patent [19]

Vik

[11] 4,103,699

[45] Aug. 1, 1978

[54] FLUID CYLINDER MOUNTED LOCK OUT VALVE DEVICE

[75] Inventor: Albam M. Vik, New Brighton, Minn.

[73] Assignee: Avon Enterprises, Inc., Melrose, Minn.

[21] Appl. No.: 705,949

[22] Filed: Jul. 16, 1976

[51] Int. Cl.[2] ........................ F15B 13/042; G05D 7/00

[52] U.S. Cl. ........................................ 137/106; 91/420

[58] Field of Search .......................... 91/420; 137/106; 60/476

[56] References Cited

U.S. PATENT DOCUMENTS

| | | | |
|---|---|---|---|
| 2,401,258 | 5/1946 | Livers | 91/420 X |
| 2,588,520 | 3/1952 | Halgren | 91/420 |
| 3,213,874 | 10/1965 | Schmiel et al. | 91/420 |
| 3,795,178 | 3/1974 | Roche | 91/420 |
| 3,857,404 | 12/1974 | Johnson | 91/420 |
| 3,975,987 | 8/1976 | Panis | 60/476 X |

*Primary Examiner*—Irwin C. Cohen

[57] ABSTRACT

A lock out for fluid cylinders, such as hydraulic cylinders operating farm machinery, which prevents the supported load from dropping and provides a lock out valve independent of the ordinary control valve used with the cylinder. The lock out unit mounts on the cylinder and within the outer peripheral dimensions of the cylinder. The linear acting valve operates in the same direction as movement of the cylinder itself to provide a compact, directly mounted lock out.

2 Claims, 3 Drawing Figures

FIG. 1
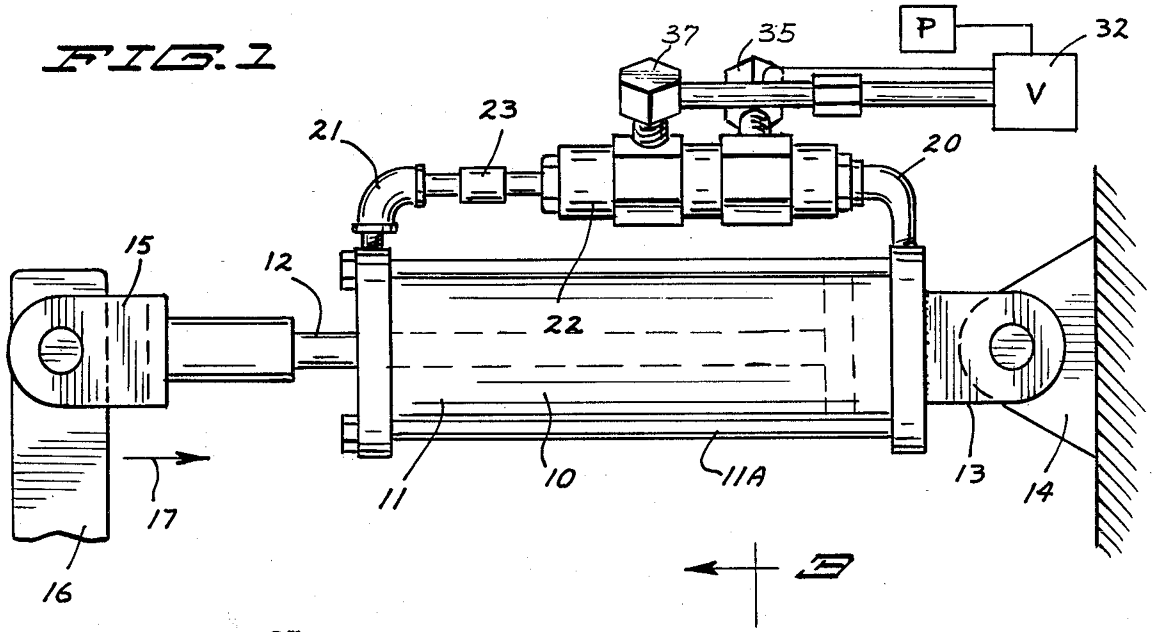
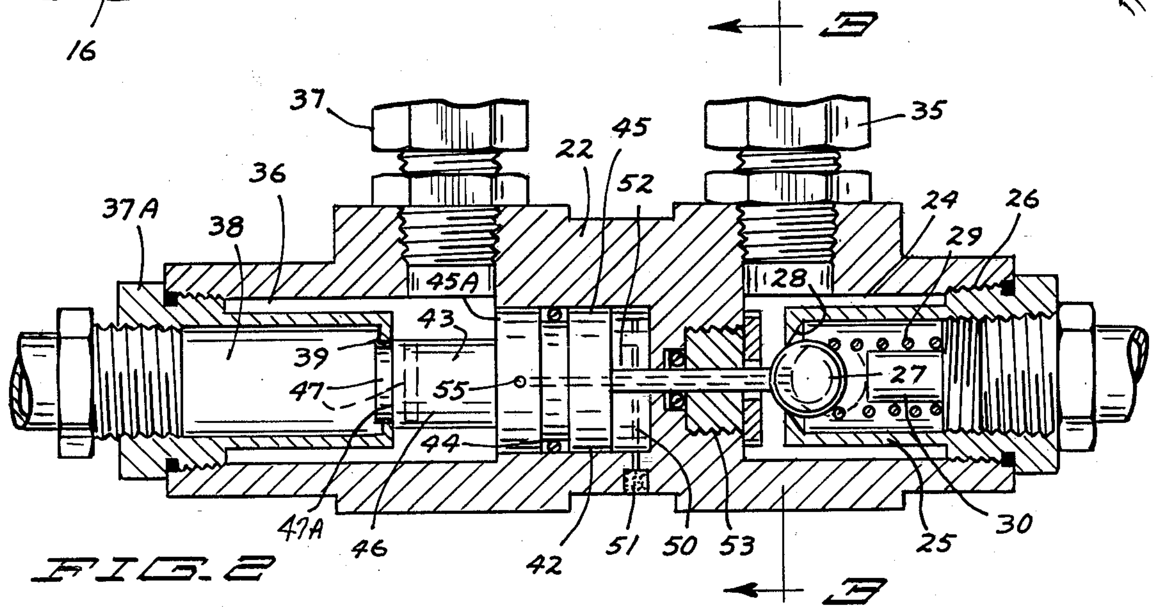
FIG. 2
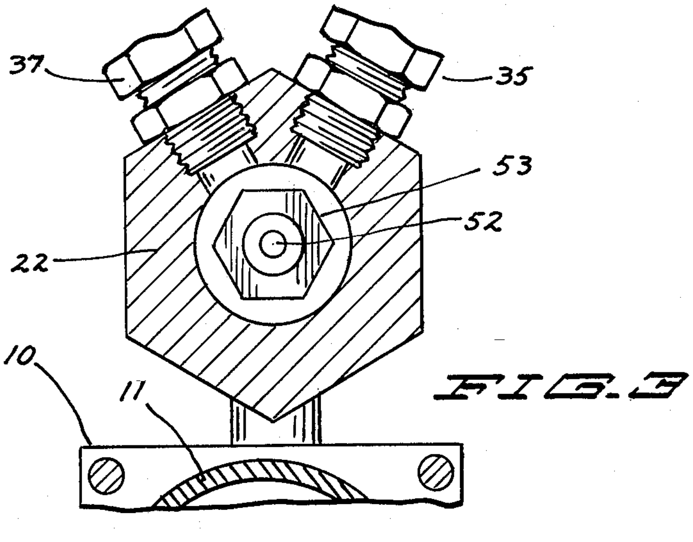
FIG. 3

FLUID CYLINDER MOUNTED LOCK OUT VALVE DEVICE

BACKGROUND OF THE INVENTION

1. Field of the Invention

The present invention relates to lock out valves for remotely actuated fluid cylinders.

2. Prior Art

Various lock out type pilot operated valves which provide a lock out feature have been advanced in the prior art, but most of these are integrated into control valves, or otherwise bulky and difficult to use. For example, a type of control apparatus that prevents leakage from a remote hydraulic motor is shown in U.S. Pat. No. 3,308,844, and a differential pressure responsive device for comparing pressures and for providing a latch comparator is shown in U.S. Pat. No. 3,570,516.

Additionally, it has been known to use pilot operated check valves in fluid circuits to prevent bleeding of fluid from a remote hydraulic motor such as a cylinder under load and to permit retracting of the cylinder when pressure is applied to the return side of the cylinder.

U.S. Pat. No. 2,420,554 shows a bypass valve for use between a normal control valve and the fluid pressure motor as well.

A hydraulic control valve that is connected to provide a flow blockage from a remote cylinder is also shown in U.S. Pat. No. 3,643,696.

Another lock out is shown in U.S. Pat. No. 3,568,718.

SUMMARY OF THE INVENTION

The present invention relates to a easily manufactured, easily used lock out control valve to positively block fluid flow in at least one direction from a hydraulic cylinder to prevent loads held by the cylinder from being accidentally dropped if the remote control valve is used when the unit is at a rest position, or to prevent leakage from the cylinder when it is under load. The device comprises a valve body that has an axially operable pilot valve that controls a check valve on the base or load side of the cylinder. The valve body is formed with separate ports for the attached hydraulic lines and it can be coupled directly through suitable pipe couplers to the cylinder with which it is used. The valve fits within the space defined by the cylinder to make it a small and directly mounted unit. In this way problems that may occur if a hose is used, which may rupture, can be eliminated because of the direct pipe connections to the cylinder ends.

The unit in the form shown is made so that it will not "chatter" as the load is lowered, because of differential areas on the pilot operated piston leading from the return side of the cylinder. The feature of having an in line pilot operated check valve also is important with an ordinary pilot valve even if there is some chatter when the load is lowered.

BRIEF DESCRIPTION OF THE DRAWINGS

FIG. 1 is a side elevational view of a typical hydraulic cylinder having a lock out valve made according to the present invention installed thereon;

FIG. 2 is a longitudinal sectional view of the control valve with the inlet ports rotated into alignment with the sectional view; and FIG. 3 is a sectional view taken generally along the line 3—3 in FIG. 2.

DESCRIPTION OF THE PREFERRED EMBODIMENTS

A hydraulic cylinder illustrated generally at 10 has a body member or barrel 11, an extendable and retractable rod 12 that is operated by an internal piston, a base clevis 13 that is attachable to a support 14, and a rod end clevis 15 that is attachable to a load 16. The load exerts a force, in the form shown, tending to compress the rod 12 toward the cylinder as indicated by the arrow 17. The internal piston within the barrel 11 is actuated by pressure on one side of the piston or the other through a conduit 20 leading to the base end of the piston, or a conduit 21 leading to the rod end. The conduits 20 and 21 connect to opposite ends of a lock out valve assembly 22. A suitable coupling 23 can be used for attaching the valve ends directly to the pipe fittings shown, so that the valve 22 is fixedly attached to the cylinder, and as can be seen in FIGS. 2 and 3, is within the outer peripheral dimensions of the cylinder 10.

Suitable tension rods 11A hold end plates of the cylinder onto the barrel 11 in the form shown, and it is to be understood that this form of making hydraulic cylinders is conventional and well known.

The valve body 22, as shown, adjacent the base end of the cylinder has a chamber 24 defined therein which receives a check valve nipple 25 of generally conventional design. The nipple 25 includes a check valve body 26 threaded into the lock out valve body, a ball check valve 27 that will close off against a seat 28 on the interior of the check valve body, a spring 29 that urges the ball toward the valve seat 28, and a stop member 30 threadably mounted on the interior of the check valve body and positioned to prevent the ball 27 from moving away from the seat more than a desired amount. The interior of the check valve body 26 is connected to conduit 20. This end of the lock out valve is thus open to the base end of the cylinder 10. It can therefor be seen that when the check valve ball 27 is against the seat 28, flow out of the base end of the cylinder, which would be caused by the force on the rod in the direction of arrow 17 is prevented by the check valve, independently of the main four-way control valve illustrated at 32 that controls the cylinder. The chamber 24 is open through a suitable fitting 35 and conduit to the valve 32.

Additionally, at the opposite end of the lock out valve body 22 there is a chamber 36, which is open to a fitting 37 that leads through a suitable conduit to the valve 32. The chamber 36 receives a coupling fitting 37A leading from a conduit that is connected through the coupling 23 to the rod end of the cylinder 11. The coupling 37A has an interior chamber 38, and an outlet port defined at 39 at the one interior, which is of smaller diameter than the interior chamber 38. The chamber 36 further opens to a valve spool chamber 42 that is at the inner end thereof, and on the opposite side of the fitting opening 39 from the fitting main portion. A valve spool 43 is mounted inside the chamber 42, and may be slidably sealed with respect thereto with an O ring 44. The valve spool 43 has a valve piston portion 45 that fits in the chamber 42, and has a shank portion 46 extending into the chamber 36. The shank in turn has a boss 47 formed at the end thereof that fits inside the opening or port 39 and substantially blocks the port when in the position shown in solid lines. The boss 47 has a shoulder 47A surrounding it that mates with the surfaces surrounding port 39. The boss 47 and port 39 form a valve controlling flow out of chamber 36 to the cylinder.

The side of the valve piston 45 opposite from the chamber 36 is open to a vented chamber 50 that is vented to atmosphere through a filter 51. The valve spool 43 in addition has an actuating tang or probe 52 mounted thereon which extends through provided passageway, and through a suitable sealing and packing means indicated generally at 53 into the chamber 24. The stem 52 is co-axial with the central axis of the cock out valve body 24 and also therefor aligns with the ball check valve 27. The stem 52 is selected in length so that when the parts are in the position shown in solid lines, with the boss 47 closing off the port 39, the ball 27 will be seated on seat 28 to prevent flow from the base end of the cylinder 10. It should also be noted that a small orifice 55 is provided in the valve spool 43 and a passageway shown in dotted lines connects to this orifice and extends through the stem 52 to fluidly connect the chambers 36 and 24 through the restricted orifice. Very little flow will pass through orifice 55, but it permits equalization of pressures in chambers 24 and 36 when the device is at rest.

The operation of the device when it is holding a load and preventing the load from dropping is illustrated in FIG. 2. However, if the load 16 is to be lowered under control, the main control valve 32 will be actuated, and fluid under pressure will be supplied through the fitting 37 to the chamber 36. This fluid under pressure will act on the face 45A of the valve piston portion 45 and cause the valve piston portion 45 to move in direction toward the chamber 24. This will cause the boss 47 to start to withdraw from port 39 and will cause the stem or actuator 52 to move the ball 27 away from the seat 28 and permit flow to pass from the base end of the cylinder out through the fitting 35 and back through the valve 32 to reservoir in the normal manner. Make-up fluid for the rod side of the cylinder will be provided through the port 39 when the boss 47 is moved sufficiently to open the port 39. The pressure in chamber 36 will also be acting on shoulder 47A. The distance that boss 47 must move is selected so that the movement of the valve piston 45 will be sufficient to cause the ball 27 to be moved off its seat by stem 52 before flow is permitted into the chamber 38 and the return conduit leading to the rod end of the cylinder. The dotted line position of boss 47 in FIG. 2 represents a typical amount of movement.

When the valve 32 is closed off (centered) the unit will return to its position shown in FIG. 2 and the pressures inside the chambers 24 and 36 will again equalize by orifice 55. The rod will be held from retraction by the check valve 27 which prevents flow from the base of the cylinder.

The unit will operate without the use of the boss 47, but the boss 47 assures smooth operation. When the unit is made without the boss 47, the pressure on face 45A will cause the ball 27 to be unseated, and flow to pass through the chamber 38, to the rod end of the cylinder as the cylinder retracts.

In the operation without the boss 47, the pressure in chamber 36 would tend to drop as soon as ball 27 was unseated and the valve piston 45 would tend to move to position permitting the check valve ball 27 to seat again. Then subsequently pressure will build up in chamber 36 to cause the ball 27 to be unseated. This could cause a chattering as the load is lowered, as is common in many lock out valves presently on the market. However, with the boss 47 closing off flow through port 39 until such time as the ball 27 is unseated enough to permit full return flow from the base end of the cylinder, this chattering is avoided, and the unit operates in a smooth, safe manner. Also, the area of shoulder 47A creates additional force for holding the check valve ball open when chamber 36 holds pressure.

It can be seen that independently of operation of the valve 32, when the cylinder is not in operation, the rod will be prevented from retraction by the check valve 27.

The lock out valve features an "in line" valve that has its chambers formed along a central axis and thus it can be easily machined in an automatic screw machine, resulting in low cost. Because close tolerances are not required low cost is achieved.

The piston 45 provides a direct force to unseat the check valve 27, and the boss 47, while not being completely fluid tight with respect to the port 39, prevents flow into the chamber 36 to a sufficient degree so that the pressure on the face 45A is maintained while the rod is being lowered. This keeps the ball 27 unseated for the return flow. When the rod 12 is extended, the return flow through chamber 36 will force the boss 47 open and vent 51 permits valve piston 45 to be retracted.

What is claimed is:

1. A lock out valve assembly for controlling fluid flow to and from a hydraulic jack cylinder which comprises (a) an elongated valve body having a passageway extending longitudinally therethrough, (b) rigid conduit means for connecting the ends of the said passageway to opposite ends of a jack cylinder, (c) the passageway including first and second chambers opening one to each of said conduit means and being separated by a spool chamber, (d) first and second port means for connecting fluid lines respectively to said first and second chambers, (e) a cylindrical valve spool slidably disposed in the spool chamber with its end faces open one to each of said first and second chambers, (f) a ball check valve in the first chamber between the conduit means and first port means to check the flow from the end of a cylinder to which it is connected, (g) a valve in the second chamber between the conduit means and second port means permitting open flow of fluid under pressure from the conduit means into the chamber but substantially blocking flow of fluid from the chamber to the conduit means, (h) said valve spool having a stem extending axially therefrom into the first chamber and adapted to engage and unseat the ball check valve when fluid pressure is applied to the end face of the spool open to the second chamber, (i) said spool and stem having a small orifice extending axially therethrough to provide limited open communication between the first and second chambers, and (j) the ball check valve closing the end of the orifice in the stem when the stem is in unseating engagement with the check valve.

2. A lock out valve assembly for use with fluid pressure cylinders including a body member having first and second chambers each defining a fluid passageway for fluid flow from opposite ends of a fluid pressure cylinder, a check valve in one of said chambers normally preventing flow in one direction through said valve body, means forming a valve in the other of said chambers to prevent flow out of the other chamber to a cylinder, an actuator piston open to the other chamber, means coupling said actuator piston to said check valve and said means forming a valve in the other chamber whereby pressure acting on said piston causes the piston to move and first open the check valve a desired amount and then open the means forming a valve in the other chamber, said means forming a valve in the other chamber comprising a port defined in the other chamber, a valve spool connected to said piston and having a boss extending into said port, said boss being moved in a direction to withdraw from said port as the actuator piston moves under pressure, said port being surrounded by a surface facing said piston and spool, and a shoulder formed on said spool surrounding said boss and engaging the surface surrounding said port when the means forming a valve in the other chamber is closed.

* * * * *